(12) United States Patent
Huang-Fu et al.

(10) Patent No.: US 11,284,458 B2
(45) Date of Patent: *Mar. 22, 2022

(54) HANDLING OF MAPPED EPS BEARER CONTEXT WITH DUPLICATE EPS BEARER ID

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Shang-Ru Mo, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 76 days.

This patent is subject to a terminal disclaimer.

(21) Appl. No.: 16/792,448

(22) Filed: Feb. 17, 2020

(65) Prior Publication Data

US 2020/0267783 A1 Aug. 20, 2020

Related U.S. Application Data

(60) Provisional application No. 62/806,927, filed on Feb. 18, 2019.

(51) Int. Cl.
*H04W 76/11* (2018.01)
*H04W 76/30* (2018.01)
*H04W 76/10* (2018.01)

(52) U.S. Cl.
CPC ........... *H04W 76/11* (2018.02); *H04W 76/10* (2018.02); *H04W 76/30* (2018.02)

(58) Field of Classification Search
None
See application file for complete search history.

(56) References Cited

U.S. PATENT DOCUMENTS

| 2017/0339609 | A1 | 11/2017 | Youn et al. |
| 2020/0068445 | A1 | 2/2020 | Wu et al. |
| 2020/0077315 | A1* | 3/2020 | Jin ................. H04W 28/0252 |

(Continued)

FOREIGN PATENT DOCUMENTS

| CN | 108282832 A | 1/2017 |
| CN | 108811000 A | 5/2017 |
| WO | WO2018128494 A1 | 1/2017 |

OTHER PUBLICATIONS

International Search Report and Written Opinion of International Search Authority for PCT/CN2020/075686 dated Apr. 24, 2020 (9 pages).

(Continued)

*Primary Examiner* — Kouroush Mohebbi
(74) *Attorney, Agent, or Firm* — Imperium Patent Works; Zheng Jin

(57) ABSTRACT

A method of handling mapped EPS bearer context with duplicate EPS bearer ID (EBI) for 5GS to EPS inter-system change enhancement is proposed. UE is provided with a mapped EPS bearer context IE by the network to create a new mapped EPS bearer associated with a PDU session. UE detects collision of the new mapped EPS bearer—it has the same EBI as an existing EPS bearer. Upon successfully process the create request, UE either replaces the existing EPS bearer with the new mapped EPS bearer, or deletes the EPS bearer with duplicate EBI by explicit signaling to the network. As a result, when inter-system change from 5G to EPS happens, there is no EPS collision.

18 Claims, 4 Drawing Sheets

(56) References Cited

U.S. PATENT DOCUMENTS

2020/0267780 A1* 8/2020 Huang-Fu ............. H04W 76/30
2021/0168595 A1* 6/2021 Sun ..................... H04W 12/106

OTHER PUBLICATIONS

S2-174196 SA WG2 Meeting #122, Ericsson, "Allocation of EPS bearer ID in 5GS", San Jose del Cabo, Mexico, Jun. 26-30, 2017 (8 pages) *section 4.11.1.1*.
S2-1810710 3GPP TSG-SA WG2 Meeting #129, Huawei et al., "Correction of EBI allocation for interworking from 5GC-N3IWF to EPS", Dongguan, China, Oct. 15-19, 2018 (8 pages).

* cited by examiner

HANDLING OF MAPPED EPS BEARER CONTEXT WITH DUPLICATE EPS BEARER ID

CROSS REFERENCE TO RELATED APPLICATIONS

This application claims priority under 35 U.S.C. § 119 from U.S. Provisional Application No. 62/806,927, entitled "Enhancement of 4G 5G Inter-system Change", filed on Feb. 18, 2019, the subject matter of which is incorporated herein by reference.

TECHNICAL FIELD

The disclosed embodiments relate generally to wireless communication, and, more particularly, to method of handling of PDU session procedure and mapped EPS bearer context in 5G system (5GS) and 4G LTE systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G, a Protocol Data Unit (PDU) session establishment is a parallel procedure of a Packet Data Network (PDN) connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Each QoS flow may include multiple QoS rules consisting of QoS profile, packet filters, and precedence order.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. This implies that the mapped/associated EPS bearer context should not exist if there is no corresponding QoS flow description. Otherwise, after inter-system change (e.g., from 5GS to EPS), if an EPS bearer is established based on the mapped EPS bearer context without QoS flow description, the associated QoS flow is undefined.

During a PDU session establishment or modification procedure, a UE may receive a mapped EPS bearer context IE of the PDU session for creating a new mapped EPS bearer having an EBI. However, if an existing mapped EPS bearer having the same EBI is associated with a PDU session, then a collision occurs on the EPS bearer. When inter-system changes from 5GS to EPS, UE behavior is undefined on how to handle such collision.

A solution is sought.

SUMMARY

A method of handling mapped EPS bearer context with duplicate EPS bearer ID (EBI) for 5GS to EPS inter-system change enhancement is proposed. UE is provided with a mapped EPS bearer context IE by the network to create a new mapped EPS bearer associated with a PDU session. UE detects collision of the new mapped EPS bearer—it has the same EBI as an existing EPS bearer. Upon successfully process the create request, UE either replaces the existing EPS bearer with the new mapped EPS bearer, or deletes the EPS bearer with duplicate EBI by explicit signaling to the network. As a result, when inter-system change from 5G to EPS happens, there is no EPS collision.

In one embodiment, a UE receives a Protocol data unit (PDU) session related message for a first PDU session in a mobile communication network. The PDU session related message carries a mapped evolved packet system (EPS) bearer context information element (IE) associated to the first PDU session. The UE determines that the mapped EPS bearer context IE comprises a new mapped EPS bearer to be created at the UE for the first PDU session. The new mapped EPS bearer has an EPS bearer identity (EBI). The UE detects that an existing mapped EPS bearer having the same EBI is associated with a second PDU session. The UE deletes the existing mapped EPS bearer associated with the second PDU session, or the UE deletes the new mapped EPS bearer associated with the first PDU session, upon successfully creating the new mapped EPS bearer for the first PDU session.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
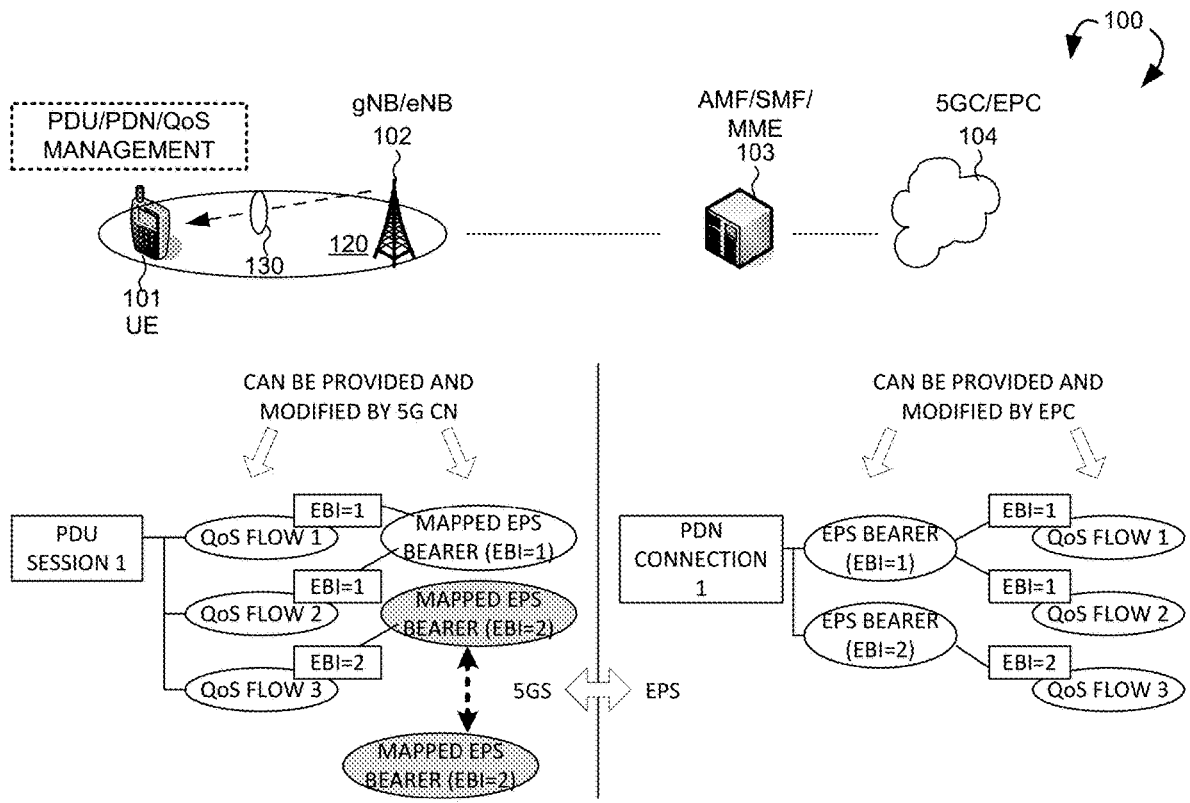
FIG. 1 illustrates an exemplary 5G network supporting Protocol Data Unit (PDU) session and Quality of Service (QoS) rule management with inter-system change and handling of mapped Evolved Packet System (EPS) bearer context in accordance with one novel aspect.

FIG. 1 illustrates an exemplary 5G network 100 supporting Protocol Data Unit (PDU) session and Quality of Service (QoS) rule management with inter-system change and handling of mapped Evolved Packet System (EPS) bearer context in accordance with one novel aspect. 5G new radio (NR) network 100 comprises a user equipment UE 101, a base station gNB 102, an access and Mobility Management Function (AMF)/Session Management Function (SMF) 103, and a 5G core network 5GC 104. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF/SMF 103 communicates with gNB 102 and 5GC 104 for access and mobility management and PDU session management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can used on the PDN) is assigned to the UE for its connection to the PDN. In 4G, EPS has defined a Default EPS Bearer to provide the IP Connectivity that is Always-On. In 5G, a Protocol Data Unit (PDU) session establishment procedure is a parallel procedure or a PDN connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. This implies that the mapped/associated EPS bearer context should not exist if there is no corresponding QoS flow description. Otherwise, after inter-system change (e.g., from 5GS to EPS), if an EPS bearer is established based on the mapped EPS bearer context without QoS flow description, the associated QoS flow is undefined. This principle applies to PDU session establishment and modification procedures when mapped EPS bearer context IE is provided.

In the example of FIG. 1, UE 101 establishes a PDU session 1, which includes QoS flow1, QoS flow2, and QoS flow3 in Non-Access Stratum (NAS) layer. QoS flow1 has a mapped EPS bearer with EBI=1, and QoS flow2 also has a mapped EPS bearer with EBI=1. QoS flow 3 has a mapped EPS bearer with EBI=2. Later on, UE 101 also receives a mapped EPS bearer context IF containing instruction to create a new mapped EPS bearer with EBI=2 for another PDU session. However, the mapped EPS bearer with EBI=2 already exists, and is associated with PDU session 1. In accordance with one novel aspect, if the other PDU session is the same as PDU session 1, then UE does not diagnose an error and simply replace the existing EPS bearer with the newly created EPS bearer. If the other PDU session is not PDU session 1, then the UE initiates a PDU session modification procedure to delete the duplicate EPS bearer (EBI=2), with 5GSM cause #85 "invalid mapped EPS bearer identity". As a result, when inter-system change occurs from 5GS to EPS, UE will not detect collision on the EPS bearers with the same EBI in EPS system.

Figure 2:
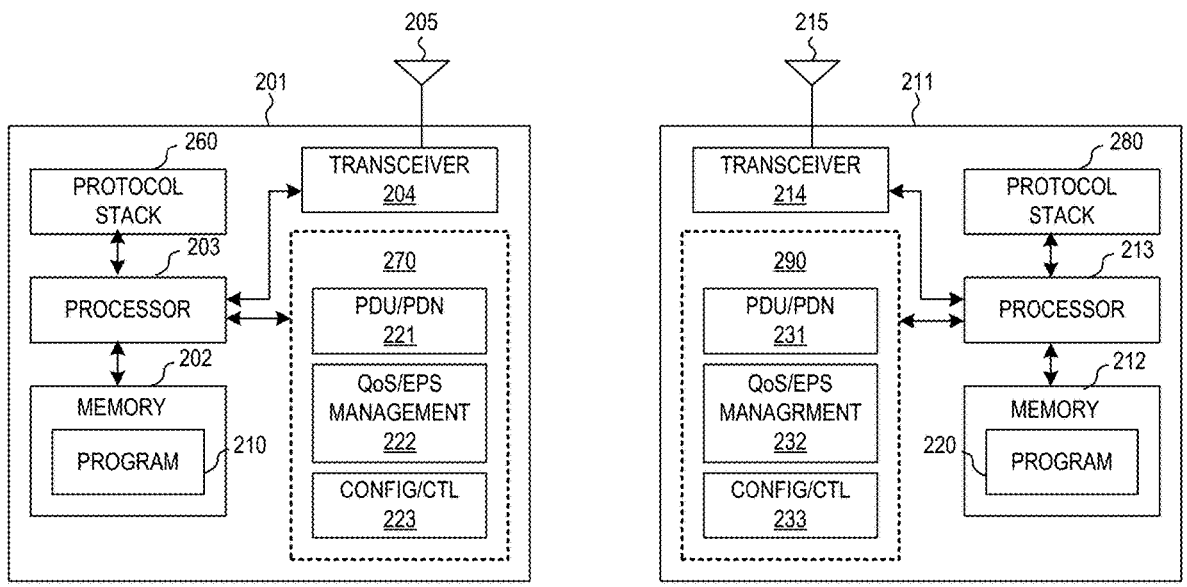
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. QoS and EPS bearer management circuit 232 creates, modifies, and deletes QoS and EPS bearers for UE. Configuration and control circuit 233 provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session and PDN connection handling circuit 221 that performs PDU session and PDN connection establishment and modification procedures with the network, an EPS bearer handling circuit 222 that manages, creates, modifies, and deletes mapped EPS bearer contexts, a config and control circuit 223 that handles configuration and control parameters for mobility management and session management. In one example, if a mapped EPS bearer context IE is provided by the network to create a mapped EPS bearer with duplicate EBI, then UE either replace the existing EPS bearer with the new mapped EPS bearer, or delete the duplicate EPS bearer by explicit signaling to the network.

Figure 3A:
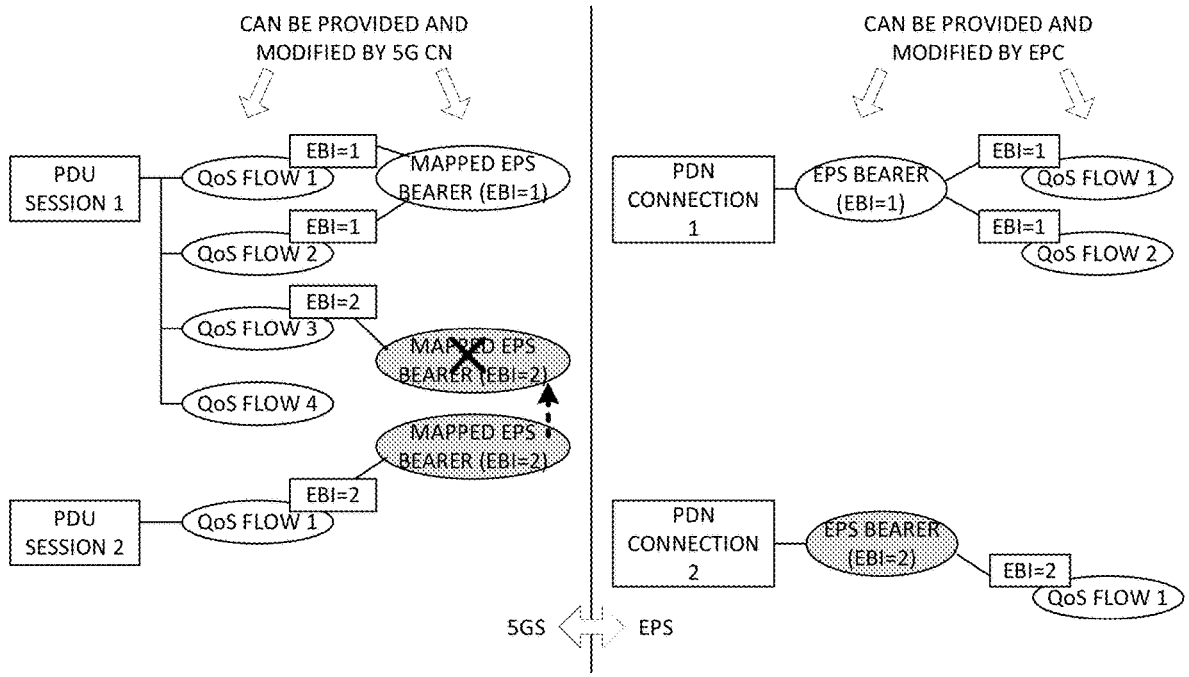
FIG. 3A illustrates a first embodiment of inter-system change from 5GS to EPS supporting PDU session to PDN connection mapping and handling mapped EPS bearer context collision during PDU session establishment or modification procedures.

FIG. 3A illustrates a first embodiment of inter-system change from 5GS to EPS supporting PDU session to PDN connection mapping and handling mapped EPS bearer context collision during PDU session establishment or modification procedures. A PDU session establishment in 5G is a parallel procedure of a PDN connection procedure in 4G. A PDU session defines the association between the UE and the data network that provides a PDU connectivity service. Each PDU session is identified by a PDU session ID, and may include multiple QoS flows and QoS rules in Non-Access Stratum (NAS) layer. In the example of FIG. 3A, PDU session 1 includes QoS flow1, QoS flow2, QoS flow3, and QoS flow4; and PDU session 2 includes QoS flow1. Each QoS flow in NAS layer needs to be supported by a mapping Data Radio Bearer (DRB) in Access Stratum (AS) layer. For PDU session 1, QoS flow1 is associated to a mapped EPS bearer context with EBI=1, QoS flow2 is also associated to the mapped EPS bearer context with EBI=1, and QoS flow 3 is associated to a mapped EPS bearer context with EBI=2. Both QoS flow4 in PDU session 1 and QoS flow1 PDU session 2 have no association of any mapped EPS bearer context. Later on, UE is provided with a new mapped EPS bearer context with EBI=2, which is to be created and associated to QoS flow1 in PDU session 2. Since an existing mapped EPS bearer with EBI=2 is already associated to QoS flow3 of PDU session 1, the UE thus detects that a potential EPS bearer collision may occur after inter-system change from 5GS to EPS.

In the first embodiment of FIG. 3A, UE creates the new mapped EPS bearer context with EBI=2 to be associated to QoS flow1 in PDU session 2, and initiates a PDU session modification procedure to delete the existing mapped EPS bearer with EBI=2. As a result, QoS flow3 in PDU session 1 is not associated to any mapped EPS bearer context. When inter-system change occurs from 5GS to EPS, PDU sessions are converted to PDN connections, and mapping EPS bearers need to be established in 4G EPS for supporting corresponding QoS flows. Therefore, upon inter-system change from 5GS to EPS, PDU session 1 is converted to a corresponding PDN connection 1. The PDN connection has an established EPS bearer with EBI=1, which is associated to QoS flow1 and QoS flow2. QoS flow3 and QoS flow4 are not transferred to EPS, i.e., it is locally released by the UE upon inter-system change. In addition, PDU session 2 is converted to PDN connection 2, which has an established EPS bearer with EBI=2 and is associated to QoS flow1.

Figure 3B:
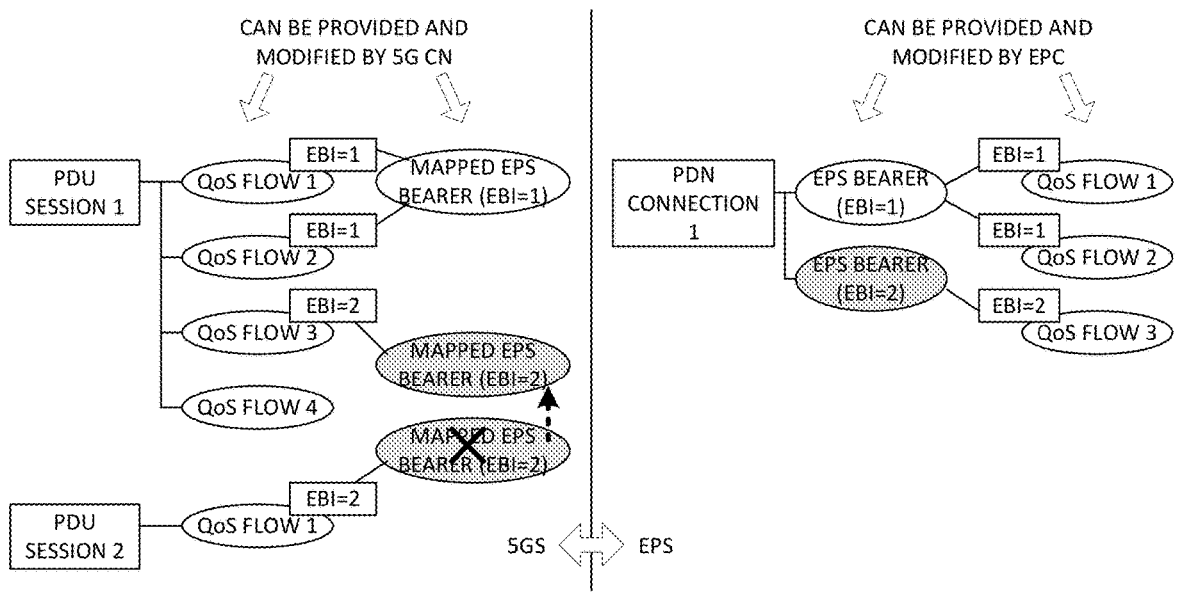
FIG. 3B illustrates a second embodiment of inter-system change from 5GS to EPS supporting PDU session to PDN connection mapping and handling mapped EPS bearer context collision during PDU session establishment or modification procedures.

FIG. 3B illustrates a second embodiment of inter-system change from 5GS to EPS supporting PDU session to PDN connection mapping and handling mapped EPS bearer context collision during PDU session establishment or modification procedures. FIG. 3B is similar to FIG. 3A, where PDU session 1 includes QoS flow1, QoS flow2, QoS flow3, and QoS flow4; and PDU session 2 includes QoS flow1. For PDU session 1, QoS flow1 is associated to a mapped EPS bearer context with EBI=1, QoS flow2 is also associated to the mapped EPS bearer context with EBI=1, and QoS flow 3 is associated to a mapped EPS bearer context with EBI=2. Both QoS flow4 in PDU session 1 and QoS flow1 in PDU session 2 have no association of any mapped EPS bearer context. Later on, UE is provided with a new mapped EPS bearer context with EBI=2, which is to be created and associated to QoS flow1 in PDU session 2. Since an existing mapped EPS bearer with EBI=2 is already associated to QoS flow3 of PDU session 1, the UE thus detects that a potential EPS bearer collision may occur after inter-system change from 5GS to EPS.

In the second embodiment of FIG. 3B, UE creates the new mapped EPS bearer context with EBI=2 to be associated to QoS flow1 in PDU session 2, and initiates a PDU session modification procedure to delete the newly created mapped EPS bearer with EBI=2 for QoS flow1 in PDU session 2. As a result, QoS flow1 in PDU session 2 is not associated to any mapped EPS bearer context. When inter-system change occurs from 5GS to EPS, PDU sessions are converted to PDN connections, and mapping EPS bearers need to be established in 4G EPS for supporting corresponding QoS flows. Therefore, upon inter-system change from 5GS to EPS, PDU session 1 is converted to a corresponding PDN connection 1. PDN connection 1 has an established EPS bearer with EBI=1, which is associated to QoS flow1 and QoS flow2. PDN connection also has an established EPS bearer with EBI=2, which is associated to QoS flow3. However, QoS flow4 in PDU session 1 and QoS flow1 in PDU session 2 are not transferred to EPS because they have no association to any mapped EPS bearer context, they are locally released by the UE upon inter-system change.

Figure 4:
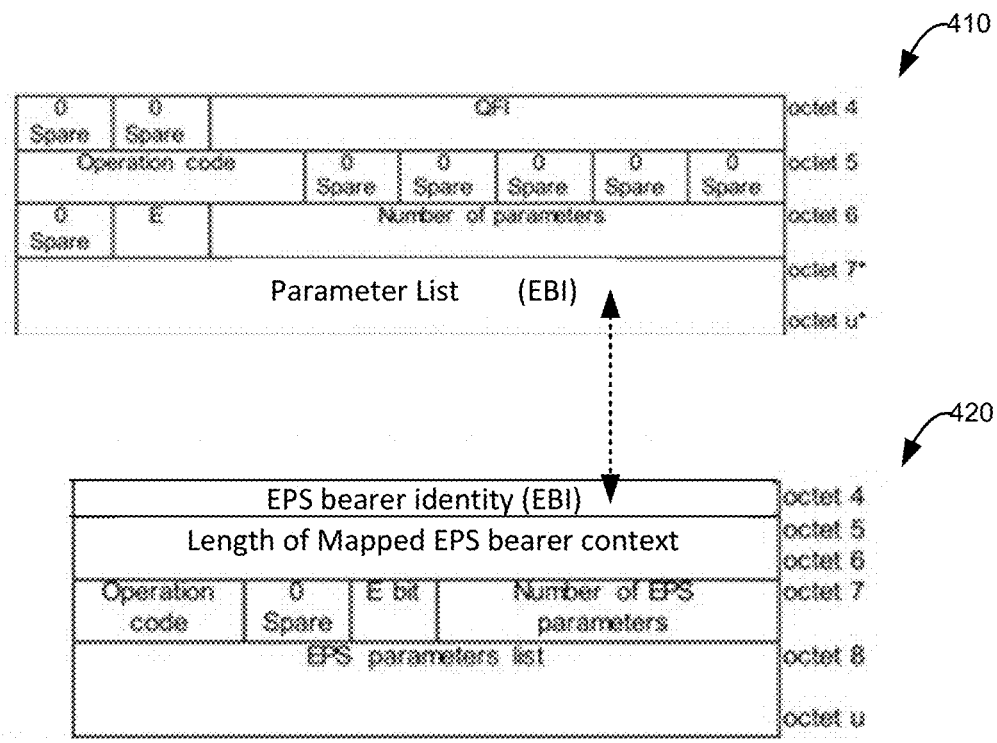
FIG. 4 illustrates one embodiment of a QoS flow description identified by a QoS flow identity (QFI) and one embodiment of a mapped EPS bearer context identified by an EPS bearer identity (EBI).

FIG. 4 illustrates one embodiment of a QoS flow description identified by a QoS flow identity (QFI) and one embodiment of a mapped EPS bearer context identified by an EPS bearer identity (EBI). For QoS flow configuration, the network can provide a QoS flow description IE to the UE, which comprises a list of QoS flow descriptions. Each QoS flow description, as depicted by 410 of FIG. 4, comprises a QFI, a QoS flow operation code, a number of QoS flow parameters, and a QoS flow parameter list. As defined by the 3GPP specification, a parameter identifier field is used to identify each parameter included in the parameter list and it contains the hexadecimal coding of the parameter identifier. For example, the following parameter identifiers are specified: 01H(5QI), 02H(GFBR uplink), 03H(GFBR downlink), 04H(MFBR uplink), 05H(MFBR downlink), 06H(averaging window), 07H(EPS bearer identity). It can be seen that one of the parameter identifiers is EBI, which is used to identify the EPS bearer that is mapped to or associated with the QoS flow. For mapped EPS bearer configuration, the network can provide a mapped EPS bearer context IE, which comprises a list of mapped EPS bearer contexts. Each mapped EPS bearer context, as depicted by 420 of FIG. 4, comprises an EBI, a length of mapped EPS bearer context, an EPS bearer operation code, a number of EPS bearer parameters, and an EPS bearer parameter list. Each mapped EPS bearer context is associated to a QoS flow through the EBI.

When creating new mapped EPS bearer, UE needs to make sure that all mapped EPS bearers do not have duplicated EBI within each PDU session and across different PDU sessions. If the same PDU session is provided with EPS bearer having duplicate EBI, then UE does not diagnose an error and simply replace the existing EPS bearer context with the newly created EPS bearer context. If different PDU sessions are provided with EPS bearer having duplicate EBI, then the UE initiates a PDU session modification procedure to delete the duplicate EPS bearer, with 5GSM cause #85 "invalid mapped EPS bearer identity". As a result, when inter-system change occurs from 5GS to EPS, UE will not detect collision on the EPS bearers with the same EBI in EPS system.

Figure 5:
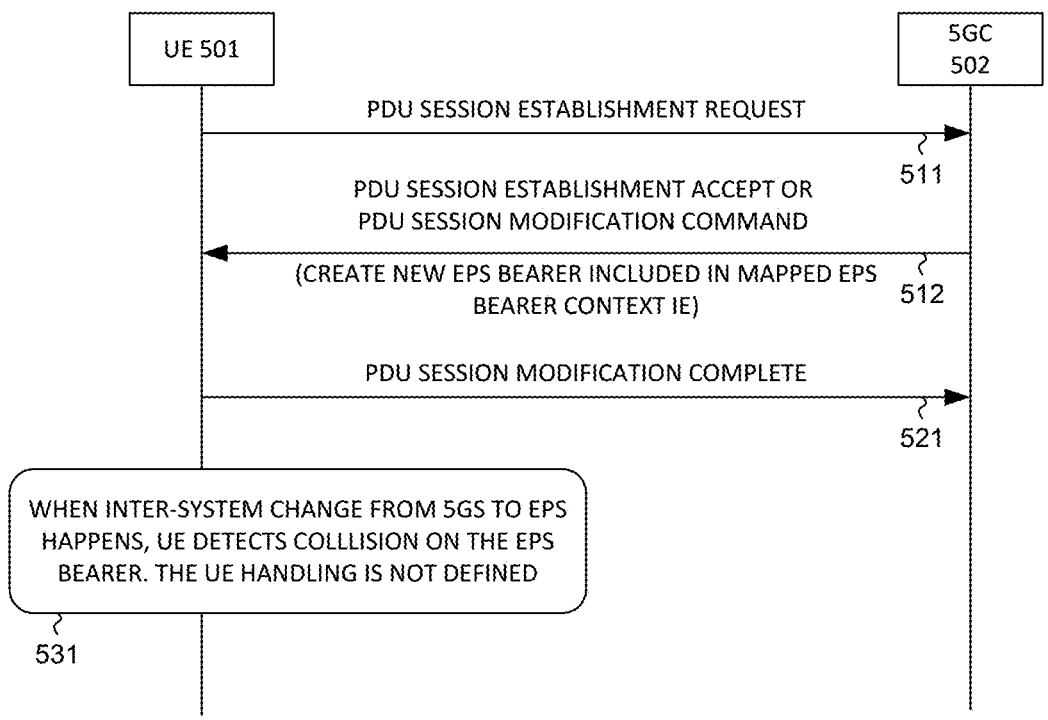
FIG. 5 illustrates a sequence flow between a UE and a network entity for PDU session establishment and modification procedures having duplicated EBI for mapped EPS bearer context.

FIG. 5 illustrates a sequence flow between a UE and a network entity for PDU session establishment and modification procedures having duplicated EBI for mapped EPS bearer context. In step 511, UE 501 sends a PDU session establishment request message to network 502. In step 512, UE 501 receives a PDU session establishment accept message from network 502 to establish the PDU session. If the PDU session is successfully established, the UE NAS layer indicates the attributes of the established PDU session (e.g., PDU session ID (PSI), Service and Session Continuity (SSC) mode, Single-Network Slice Selection Assistance Information (S-NSSAI), Data Network Name (DNN), PDU session type, access type, PDU address, etc.), and provides information (e.g., PDU address) of the established PDU session to the upper layers. The PDU session establishment accept message carries instructions for UE 501 to add new authorized QoS flow descriptions and new mapped EPS bearer contexts (e.g., via QoS flow description IE and mapped EPS bearer context IE). Alternatively, for an already established PDU session, in step 512, UE 501 receives a PDU session modification command message, which also carries instruction for UE 501 to add new authorized QoS flow descriptions and new mapped EPS bearer contexts (e.g., via QoS flow description IE and mapped EPS bearer context IE). In step 521, UE 501 sends a PDU session modification complete message to network 502. In step 531, inter-system change from 5GS to EPS happens. If UE 501 is provided with multiple mapped EPS bearers having the same EBI, then a collision occurs on the EPS bearer in EPS. The behavior of UE 501 is undefined.

Figure 6:
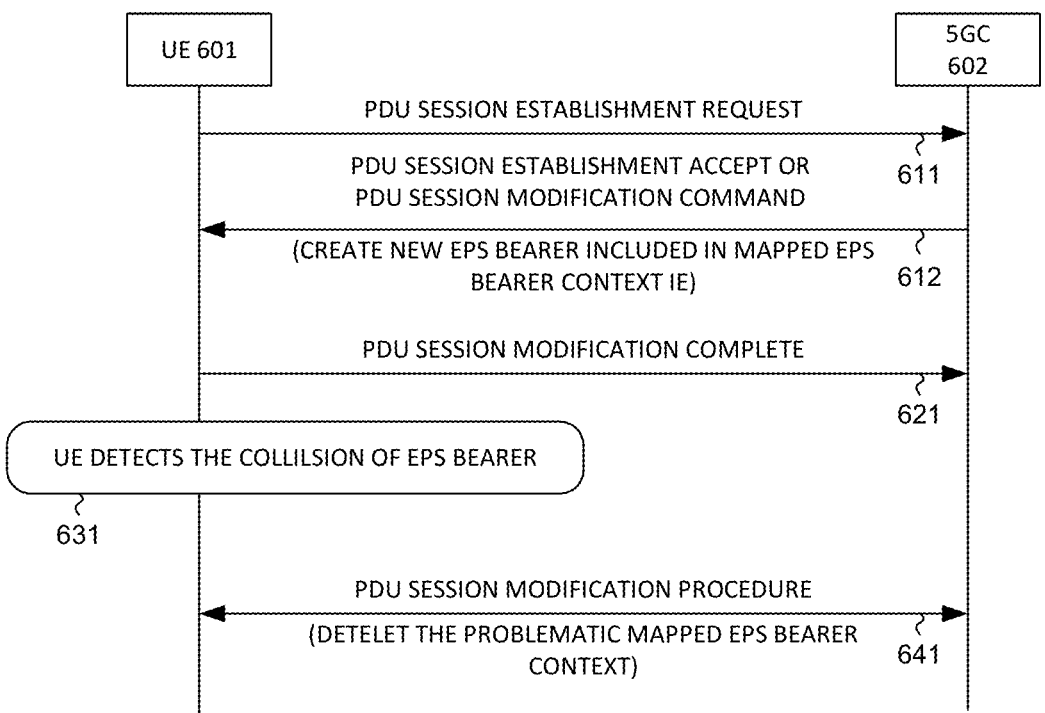
FIG. 6 illustrates a sequence flow between a UE and a network entity for PDU session establishment and modification procedures handling EPS bearer context collision in accordance with one novel aspects.

FIG. 6 illustrates a sequence flow between a UE and a network entity for PDU session establishment and modification procedures handling EPS bearer context collision in accordance with one novel aspects. Steps 611 to 621 in FIG. 6 are similar to steps 511 to 521 in FIG. 5. Via PDU session establishment or modification, network 5GC 602 provides instruction for UE 601 to add new authorized QoS flow descriptions and new mapped EPS bearer contexts (e.g., via QoS flow description IE and mapped EPS bearer context IE). In the embodiment of FIG. 6, in step 631, UE 601 detects whether there is any collision of EPS bearer that may result from the creation of mapped EPS bearer contexts. If such collision is detected, then in step 631, UE 601 initiates a PDU session modification procedure to delete the problematic mapped EPS bearer context.

Suppose that UE 601 is instructed to create a new mapped EPS bearer context associated with a first PDU session, and there is an existing mapped EPS bearer context having the same EBI is associated with a second PDU session. Under a first scenario, the first PDU session is the same as the second PDU session. UE 601 does not diagnose an error, and simply process the create new EPS bearer context request, and if the creation is processed successfully, UE 601 then deletes the existing EPS bearer context. Under a second scenario, the first PDU session is different from the second PDU session. UE 601 has two options. In a first option, UE 601 initiates the PDU modification procedure in step 641 to delete the existing mapped EPS bearer. In a second option, UE 601 initiates the PDU modification procedure in step 641 to delete the new mapped EPS bearer. In both options, the PDU session modification request message contains a 5G session management (5GSM) cause value indicating "invalid mapped EPS bearer identity".

Figure 7:
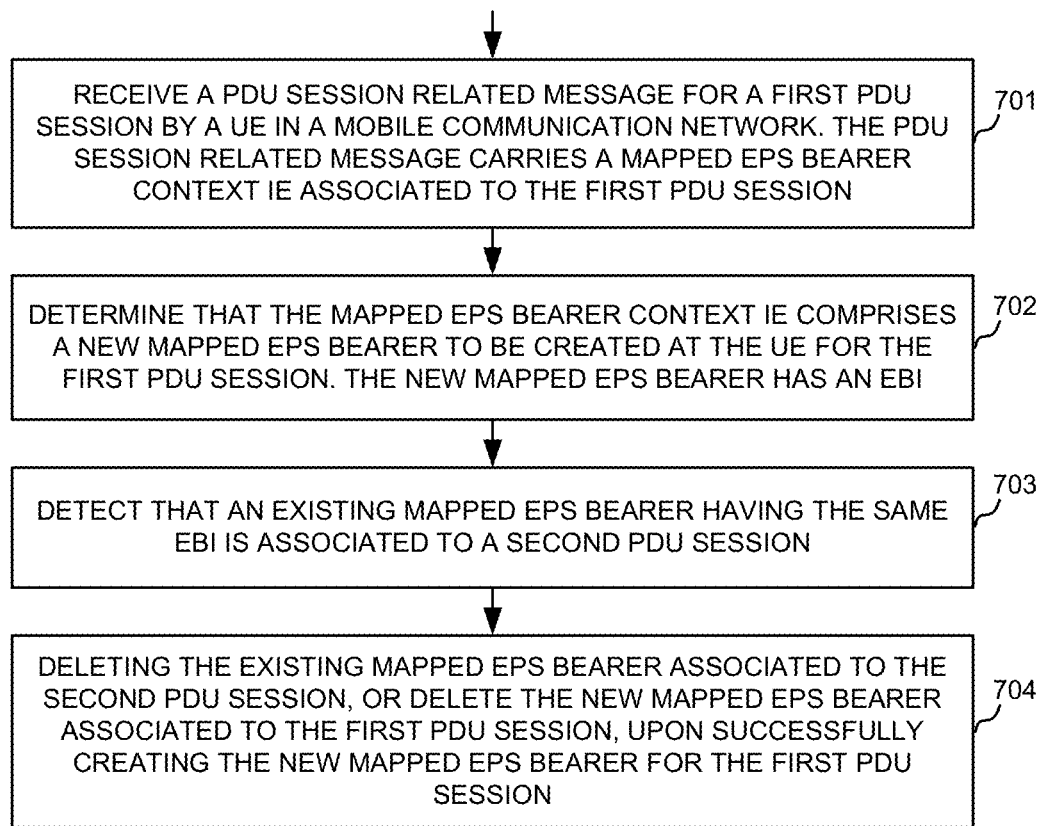
FIG. 7 is a flow chart of a method of handling EPS bearer context collision in accordance with one novel aspect of the present invention.

FIG. 7 is a flow chart of a method of handling EPS bearer context collision in accordance with one novel aspect of the present invention. In step 701, a UE receives a Protocol data unit (PDU) session related message for a first PDU session in a mobile communication network. The PDU session related message carries a mapped evolved packet system (EPS) bearer context information element (IE) associated to the first PDU session. In step 702, the UE determines that the mapped EPS bearer context IE comprises a new mapped EPS bearer to be created at the UE for the first PDU session. The new mapped EPS bearer has an EPS bearer identity (EBI). In step 703, the UE detects that an existing mapped EPS bearer having the same EBI is associated with a second PDU session. In step 704, the UE deletes the existing mapped EPS bearer associated with the second PDU session or deleting the new mapped EPS bearer associated with the first PDU session upon successfully creating the new mapped EPS bearer for the first PDU session.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a Protocol data unit (PDU) session related message for a first PDU session by a user equipment (UE) in a 5G mobile communication network, wherein the PDU session related message carries a mapped evolved packet system (EPS) bearer context information element (IE) associated to the first PDU session;
determining that the mapped EPS bearer context IE comprises a new mapped EPS bearer to be created at the UE for the first PDU session, wherein the new mapped EPS bearer has an EPS bearer identity (EBI);
detecting a duplicated EBI by determining that an existing mapped EPS bearer having the same EBI is associated to a second PDU session; and
in response to the duplicated EBI detected in the 5G network, deleting the existing mapped EPS bearer associated with the second PDU session or deleting the new mapped EPS bearer associated with the first PDU session upon successfully creating the new mapped EPS bearer for the first PDU session.

2. The method of claim 1, wherein the PDU session related message is a PDU session establishment accept message by the network in response to a PDU session establishment request message by the UE.

3. The method of claim 2, wherein the PDU session establishment accept message carries the mapped EPS bearer context IE with a "create new EPS bearer" operation code for the new mapped EPS bearer.

4. The method of claim 1, wherein the PDU session related message is a PDU session modification command message carries the mapped EPS bearer context IE with a "create new EPS bearer" operation code for the new mapped EPS bearer.

5. The method of claim 1, wherein the second PDU session is the same as the first PDU session, and wherein the UE does not diagnose an error.

6. The method of claim 5, wherein the existing mapped EPS bearer is replaced by the new mapped EPS bearer.

7. The method of claim 1, wherein the second PDU session is different from the first PDU session.

8. The method of claim 7, and wherein the UE sends a PDU session modification request message to delete the existing mapped EPS bearer for the second PDU session, and wherein the PDU session modification request message contains a 5G session management (5GSM) cause value indicating "invalid mapped EPS bearer identity".

9. The method of claim 7, and wherein the UE sends a PDU session modification request message to delete the new mapped EPS bearer for the first PDU session, and wherein the PDU session modification request message contains a 5G session management (5GSM) cause value indicating "invalid mapped EPS bearer identity".

10. The UE of claim 1, wherein the second PDU session is the same as the first PDU session, and wherein the UE does not diagnose an error.

11. The UE of claim 10, wherein the existing mapped EPS bearer is replaced by the new mapped EPS bearer.

12. A User Equipment (UE), comprising:
a receiver that receives a Protocol data unit (PDU) session related message for a first PDU session in a 5G mobile communication network, wherein the PDU session related message carries a mapped evolved packet system (EPS) bearer context information element (IE) associated to the first PDU session;
an EPS bearer handling circuit that determines that the mapped EPS bearer context IE comprises a new mapped EPS bearer to be created at the UE for the first PDU session, wherein the new mapped EPS bearer has an EPS bearer identity (EBI), wherein the UE further detects a duplicated EBI by determining that an existing mapped EPS bearer having the same EBI is associated to a second PDU session; and
a transmitter that transmits an explicit signaling, in response to the duplicated EBI detected in the 5G network, to delete the existing mapped EPS bearer associated with the second PDU session or to delete the new mapped EPS bearer associated with the first PDU session upon successfully creating the new mapped EPS bearer for the first PDU session.

13. The UE of claim 12, wherein the PDU session related message is a PDU session establishment accept message by the network in response to a PDU session establishment request message by the UE.

14. The UE of claim 13, wherein the PDU session establishment accept message carries the mapped EPS bearer context IE with a "create new EPS bearer" operation code for the new mapped EPS bearer.

15. The UE of claim 13, wherein the PDU session related message is a PDU session modification command message carries the mapped EPS bearer context IE with a "create new EPS bearer" operation code for the new mapped EPS bearer.

16. The UE of claim 12, wherein the second PDU session is different from the first PDU session.

17. The UE of claim 16, and wherein the UE sends a PDU session modification request message to delete the existing mapped EPS bearer for the second PDU session, and wherein the PDU session modification request message contains a 5G session management (5GSM) cause value indicating "invalid mapped EPS bearer identity".

18. The UE of claim 16, and wherein the UE sends a PDU session modification request message to delete the new mapped EPS bearer for the first PDU session, and wherein the PDU session modification request message contains a 5G session management (5GSM) cause value indicating "invalid mapped EPS bearer identity".

* * * * *